UNITED STATES PATENT OFFICE.

ALBERT F. ANDREWS, OF NEW HAVEN, CONNECTICUT.

IMPROVEMENT IN CASE-HARDENING MALLEABLE-IRON CASTINGS.

Specification forming part of Letters Patent No. 191,089, dated May 22, 1877; application filed November 8, 1876.

*To all whom it may concern:*

Be it known that I, ALBERT F. ANDREWS, of New Haven, in the county of New Haven and State of Connecticut, have invented certain new and useful Improvements in Case-Hardening Malleable-Iron Castings, of which the following is a specification:

I produce the castings, in the desired form, of suitable iron for subsequent malleableizing, and then submit them to the action of hydrogen, or of hydrogenous compounds, at a high temperature, in accordance with my patent dated January 30, 1872, No. 123,072. After having, by this means, reduced the castings to the condition of tough and comparatively soft malleable-iron, castings of the proper form, I pack them, in iron boxes of convenient size, with raw bone, broken more or less finely, and submit the boxes and their contents to a red heat from one hour to six hours, according to the size of the articles treated and the necessity or desirability of steelifying them quite through.

I can, instead of bone, use other nitrogenous animal substances, such as the offal or excrement of animals, and obtain good results; but I esteem bones in a raw state, as fresh from the butcher's as practicable, to be far preferable.

For a modified result, I wet the raw bones with a newly-saturated solution of cyanide of potassium in water, or of sal-ammoniac in water, or of about equal quantities of each.

The raw bone alone renders the iron articles suitable for edge-tools of good quality. The addition of the cyanide produces a finer structure. A modified softness is obtained by the sal-ammoniac.

I claim as my invention—

The within-described process of preparing steel-surfaced malleable-iron castings, which consists in treating iron castings, at high temperatures, first with hydrogen, and then with bones saturated with cyanide of potassium, or with sal-ammoniac, as herein specified.

In testimony whereof I have hereunto set my hand.

ALBERT F. ANDREWS.

Witnesses:
    EDWIN PARRINGTON,
    ELIZA TAYLOR.